US008048178B2

(12) United States Patent
Smit et al.

(10) Patent No.: US 8,048,178 B2
(45) Date of Patent: Nov. 1, 2011

(54) PROCESS FOR PRODUCING A PURIFIED SYNTHESIS GAS STREAM

(75) Inventors: Cornelis Jacobus Smit, Amsterdam (NL); Jan Volkert Zander, Amsterdam (NL)

(73) Assignee: Shell Oil Company, Houston, TX (US)

( * ) Notice: Subject to any disclaimer, the term of this patent is extended or adjusted under 35 U.S.C. 154(b) by 540 days.

(21) Appl. No.: 12/274,221

(22) Filed: Nov. 19, 2008

(65) Prior Publication Data

US 2009/0183431 A1 Jul. 23, 2009

Related U.S. Application Data

(60) Provisional application No. 60/991,160, filed on Nov. 29, 2007.

(30) Foreign Application Priority Data

Nov. 20, 2007 (EP) .................................... 07121140

(51) Int. Cl.
*C01B 3/02* (2006.01)
*C01B 3/50* (2006.01)
*C07C 1/02* (2006.01)

(52) U.S. Cl. ........ 48/197 R; 48/210; 423/650; 423/651; 423/652; 252/373

(58) Field of Classification Search .................. 423/650, 423/651, 652; 48/197 R, 210; 252/373
See application file for complete search history.

(56) References Cited

U.S. PATENT DOCUMENTS 4,430,316 A 2/1984 Ranke et al. .............. 423/573 R
4,443,561 A 4/1984 Boelema et al. .............. 518/704
4,510,874 A 4/1985 Hasenack ..................... 110/347
4,515,604 A * 5/1985 Eisenlohr et al. ........... 48/197 R
4,523,529 A 6/1985 Poll .............................. 110/263
4,836,146 A 6/1989 Russell et al. ................ 122/379
4,887,962 A 12/1989 Hasenack et al. ............. 110/263
4,891,187 A * 1/1990 Jungfer et al. ................ 423/248
4,946,476 A 8/1990 Najjar et al. ................ 48/197 R
5,441,990 A 8/1995 Robin et al. .................. 518/703
6,090,356 A * 7/2000 Jahnke et al. ................. 423/210
6,533,945 B2 3/2003 Shah ............................ 210/765
6,933,324 B2 8/2005 Stamires et al. .............. 518/719
6,976,362 B2 12/2005 Sheppard et al. ............... 60/780
2002/0144929 A1 10/2002 Moore, Jr. et al. ............ 208/108
2004/0101473 A1 5/2004 Wang et al. ................... 423/651
2005/0196332 A1 9/2005 Demirel et al. ............... 422/285
(Continued)

FOREIGN PATENT DOCUMENTS

DE 2610892 9/1977
(Continued)

*Primary Examiner* — Timothy Vanoy

(57) ABSTRACT

A process for producing a purified synthesis gas stream from a carbonaceous feedstock, the process comprising (a) oxidizing a carbonaceous feedstock to obtain syngas containing hydrogen sulphide, (b) mixing the synthesis gas with methanol, reducing the temperature of said mixture and separating a liquid methanol-water mixture from a cooled syngas, (c) contacting the cooled syngas with methanol to decrease the content of hydrogen sulphide and carbon dioxide thereby obtaining a rich methanol stream comprising hydrogen sulphide and carbon dioxide, (d) regenerating the rich methanol stream by separating from the rich methanol a carbon dioxide fraction and a hydrogen sulphide fraction to obtain lean methanol, wherein part of the methanol in the methanol-water mixture obtained in step (b) is recycled and reused in step (b) and/or (c) and wherein another part of the methanol in the methanol-water mixture obtained in step (b) is recycled to step (a).

14 Claims, 2 Drawing Sheets

U.S. PATENT DOCUMENTS

2005/0203194 A1 9/2005 Botes et al. .................. 518/716

FOREIGN PATENT DOCUMENTS

| | | |
|---|---|---|
| DE | 4336790 | 10/1993 |
| EP | 168128 | 1/1986 |
| EP | 0400740 | 12/1990 |
| EP | 450861 | 10/1991 |
| EP | 510771 | 10/1992 |
| EP | 0416212 | 2/1993 |
| EP | 0662506 | 7/1995 |
| EP | 0926441 | 6/1999 |
| EP | 904335 | 3/2001 |
| FR | 2856048 | 12/2004 |
| WO | WO0074838 | 12/2000 |
| WO | WO0176736 | 10/2001 |
| WO | WO0202489 | 1/2002 |
| WO | WO0207882 | 1/2002 |
| WO | WO03097236 | 11/2003 |
| WO | WO2004005438 | 1/2004 |
| WO | WO2006070018 | 7/2006 |
| WO | WO2007042562 | 4/2007 |

* cited by examiner 1
17
17
8
19
12'
16
20
17
6
9
10
11
12
15
12
13
5
18
14
2
3
4
7
52
51
54
53
46
45
50
24
30
23
25
31
29
39
41
44
47
28
32
20
21
22
26
35
33
40
43
46
48
38
49
36
37
34
25
27
42
23
24

83
66
66
67
63
62
61
60
64
69
68
65
64
72
73
73
70
71
75
80
74
77
79
76
78
82
81

PROCESS FOR PRODUCING A PURIFIED SYNTHESIS GAS STREAM

This patent application claims the benefit of European patent application No. 07121140.3, filed Nov. 20, 2007 and U.S. Provisional Application 60/991,160, filed Nov. 29, 2007, both of which are incorporated herein by reference

TECHNICAL FIELD OF THE INVENTION

The present invention relates to a process for producing a purified synthesis gas stream from a carbonaceous feedstock.

BACKGROUND OF THE INVENTION

It is known to prepare purified synthesis gas from a carbonaceous feedstock by first performing a partial oxidation, also referred to as gasification, of the feedstock followed by a scrubbing step, a CO shift step and a $CO_2$ and $H_2S$ removal step. Such a process is described in Gasification Technology Counsel (GTC 2004) Conference paper called "Synthesis Gas Purification in Gasification to Ammonia/Urea Complex" of John Y Mak and others (http://www.gasification.org/Presentations/2004.htm). In FIG. 5 of this paper an integrated process is described wherein a coal slurry feed is gasified in a so-called quench gasification process to obtain a raw synthesis gas. After scrubbing and a CO shift step of the raw synthesis gas $CO_2$ and $H_2S$ and other acid gasses are removed to obtain a treated synthesis gas. The $CO_2$ and $H_2S$ removal is performed by the well-known Rectisol process of Lurgi AG and Linde AG. In the Rectisol process $CO_2$ and $H_2S$ and other acid gasses are removed by contacting the synthesis gas with methanol at cryogenic temperatures.

In the Rectisol process as shown in FIG. 6 of the above publication the synthesis gas is first mixed with methanol prior to reducing the temperature of said mixture. By cooling a liquid methanol-water mixture is formed, which is separated from the gaseous synthesis gas in so-called knock-out drums. The cooled synthesis gas is subsequently contacted with cold methanol in the so-called methanol scrubber to obtain a treated synthesis gas and a rich methanol, comprising $CO_2$, $H_2S$ and other acid gasses $CO_2$, $H_2S$ and other acid gasses are removed from the rich methanol and the regenerated methanol is reused in the methanol scrubber.

The methanol as present in the water-methanol mixture is recovered in the so-called methanol/water fractionator and reused in the methanol scrubber.

An issue with the above process is that part of the methanol inventory has to be removed from the circulating methanol to avoid a build-up of certain contaminants, such as for example ammonia, cyanide, unidentified sulphur species and trace metals.

It would be an advancement in the art to provide a more efficient process, which avoids the build up of such contaminants in the $CO_2$ and $H_2S$ removal step.

SUMMARY OF THE INVENTION

The above is achieved with the following process.

A process for producing a purified synthesis gas stream from a carbonaceous feedstock, the process comprising the steps of (a) partial oxidation of the carbonaceous feedstock with a molecular oxygen comprising gas to obtain a synthesis gas comprising water, hydrogen sulphide, and carbon dioxide besides the main constituents carbon monoxide and hydrogen, (b) mixing the synthesis gas and methanol and reducing the temperature of said mixture and separating a liquid methanol-water mixture from a cooled gaseous synthesis gas, (c) contacting the cooled synthesis gas obtained in step (b) with methanol to decrease the content of hydrogen sulphide and carbon dioxide in the synthesis gas, thereby obtaining a rich methanol stream comprising hydrogen sulphide and carbon dioxide and a synthesis gas stream depleted in hydrogen sulphide and carbon dioxide;

(d) regenerating the rich methanol stream of step (c) by separating from the rich methanol a carbon dioxide fraction and a hydrogen sulphide fraction to obtain lean methanol, which lean methanol is used as methanol in step (b) and/or (c), and wherein (e) part of the methanol in the methanol-water mixture obtained in step b) is isolated and reused in step (b) and/or (c) and wherein, (f) another part of the methanol in the methanol-water mixture obtained in step (b) is recycled to step (a) under conditions such that methanol is converted into carbon monoxide and hydrogen.

Applicants found that by recycling part of the methanol as present in the methanol-water mixture obtained in step (b) to step (a) the build up of contaminants is avoided. At the same time additional synthesis gas is prepared from this waste stream when methanol is converted by an endothermic reaction to CO and $H_2$.

The invention will be described in more detail below.

DETAILED DESCRIPTION

Figure 1:
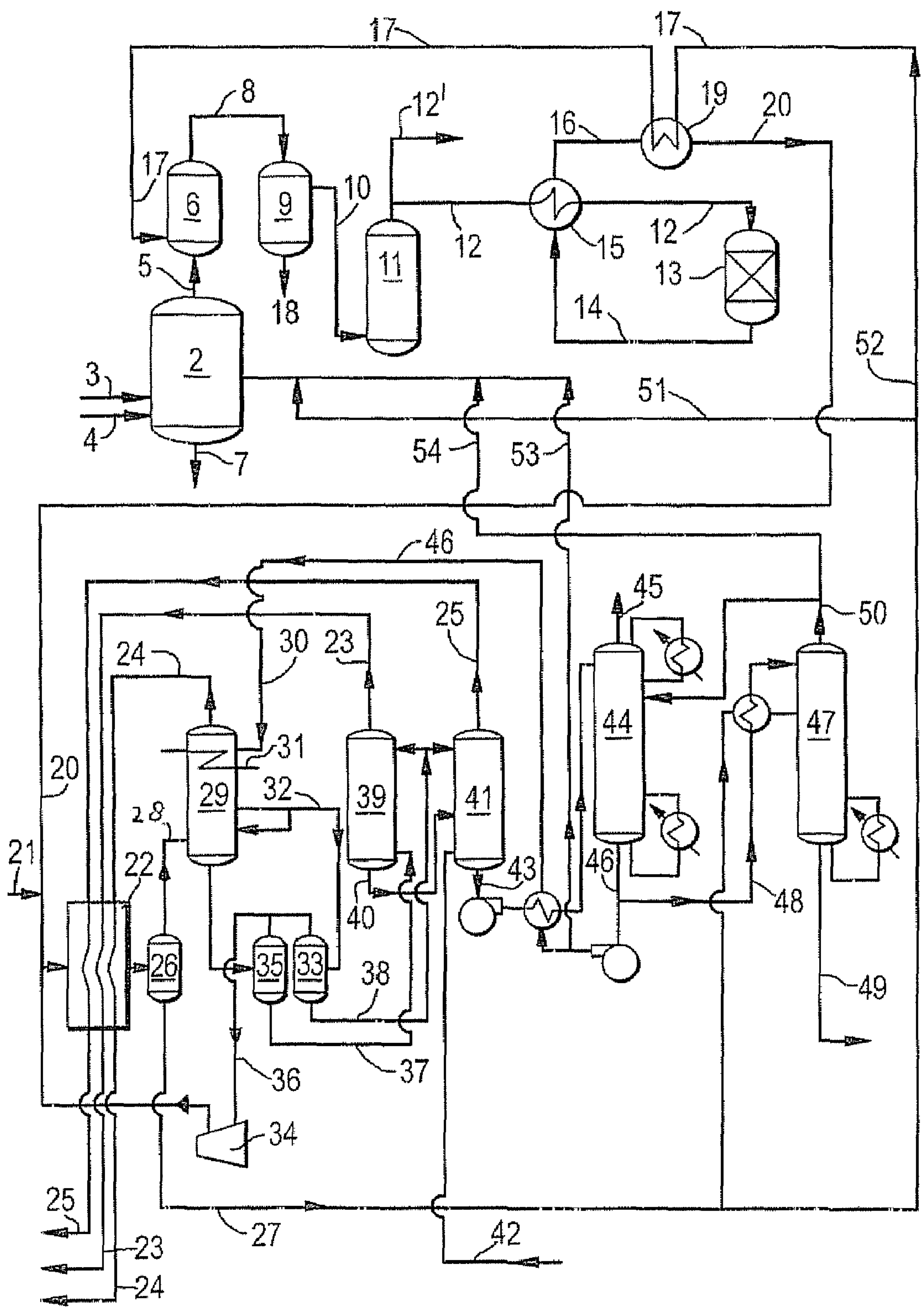
FIG. 1 shows a preferred embodiment of the present invention.

In step (a) a carbonaceous feedstock is subjected to partial oxidation with a molecular oxygen comprising gas. The partial oxidation is preferably performed at a temperature of between 1000 and 1800° C. and more preferably at a temperature between 1200 and 1800° C. The pressure at which partial oxidation is performed is preferably between 0.3 and 12 MPa and more preferably between 3 and 10 MPa. When an ash containing feedstock is used the temperature conditions are so chosen that a slag layer will form on the interior of the reactor vessel in which the partial oxidation takes place.

The carbonaceous feedstock is preferably coal, for example anthracite, brown coal, bitumous coal, sub-bitumous coal, and lignite. Examples of alternative carbonaceous feedstocks are petroleum coke, peat and heavy residues as extracted from tar sands or the asphalt fraction as separated from said residues in a de-asphalting process Residues from refineries such as residual oil fractions boiling above 360° C., directly derived from crude oil, or from oil conversion processes such as thermal cracking, catalytic cracking, hydrocracking etc may also be used as the carbonaceous feedstock.

Suitable biomass derived feedstocks containing ash are solid biomass feedstocks as obtained by torrefaction of a biomass source. Torrefaction is preferably combined with a compression or pelletation step in order to make the biomass feed more suited for a gasification process wherein the biomass feed is supplied in a so-called dry form. Torrefaction of biomass source material is well known and for example described in M. Pach, R. Zanzi and E. Björnbom, Torrefied Biomass a Substitute for Wood and Charcoal. 6th Asia-Pacific International Symposium on Combustion and Energy Utilization. May 2002, Kuala Lumpur and in Bergman, P.C.A., "Torrefaction in combination with pelletisation—the TOP process", ECN Report, ECN-C-05-073, Petten, 2005.

A suitable liquid biomass feedstock for use in the present process is obtained by drying and flash pyrolysis of a biomass source. In flash pyrolysis processes a solid char and a liquid biomass feed component is typically obtained. The present invention is also directed to embodiments wherein a so-called biomass slurry is used as feedstock. Flash pyrolysis is well known and for example described in EP-A-904335; in Dinesh Mohan, Charles U. Pittman, Jr., and Philip H. Steele. Pyrolysis of Wood/Biomass for Bio-oil: A Critical Review. Energy & Fuels 2006, 20, 848-889; and in E. Henrich: Clean syngas from biomass by pressurised entrained flow gasification of slurries from fast pyrolysis. In: Synbios, the syngas route to automotive biofuels, conference held from 18-20 May 2005, Stockholm, Sweden (2005).

Suitable biomass sources are weeds or residues of the agricultural industry. Examples of suitable residue products are streams generated in the palm oil industry, corn industry, bio-diesel industry, forestry industry, wood processing industry and paper industry.

All the above feedstocks have different proportions of carbon and hydrogen, as well as different substances regarded as contaminants. Depending on the carbonaceous feedstock, the synthesis gas will contain contaminants such as carbon dioxide, hydrogen sulphide, carbonyl sulphide and carbonyl disulphide while also nitrogen, nitrogen-containing components (e.g. HCN and $NH_3$), metals, metal carbonyls (especially nickel carbonyl and iron carbonyl), steam and in some cases mercaptans may be present.

The present invention now provides for a process wherein removal of these contaminants to low levels is performed in an efficient manner thereby obtaining synthesis gas suited for catalytic conversion reactions. An especially interesting catalytic conversion reaction is a hydrocarbon synthesis process. In a hydrocarbon synthesis process, synthesis gas is catalytically converted into hydrocarbon compounds ranging from methane to high molecular weight molecules comprising up to 200 carbon atoms, or, under particular circumstances, even more. An example of a hydrocarbon synthesis process is the Fischer-Tropsch process, described in e.g. WO 02/02489, WO 01/76736, WO 02/07882, EP 510771 and EP 450861. Especially suitable catalysts are catalysts comprising cobalt, as these types of catalysts enable a higher yield in heavier hydrocarbons. Cobalt-based Fischer-Tropsch catalysts are highly sensitive to poisoning by contaminants, requiring purified synthesis gas streams with contaminant concentrations as low as in the ppbv range.

When using solid fossil fuels such as coal as feedstock, generally the amount of $H_2S$ and COS in the synthesis gas stream leaving the gasifier is below 15 volume %, typically below 5 volume % based on the synthesis gas stream. In some cases the total amount of $H_2S$ and COS in the synthesis gas stream leaving the gasifier is in the range of from 5 to 15 ppmv, based on the synthesis gas stream, preferably from 8 to 12 ppmv based on the synthesis gas stream.

When using an oil residue as feedstock, generally the amount of $H_2S$ and COS in the synthesis gas stream leaving the gasifier will be below 20 volume %, typically below 10 volume % based on the synthesis gas stream. In some cases the total amount of $H_2S$ and COS in the feed synthesis gas stream leaving the gasifier is in the range of from 15 to 30 ppmv, preferably from 20 to 28 ppmv based on the synthesis gas stream.

Step (a) may be performed by means of various gasification processes, such as for example the so-called moving bed process, fluid bed gasifier process or the entrained-flow gasifier process as for example described in Gasification, by Christofer Higman and Maarten van der Burgt, 2003, Elsevier Science, Burlington Mass., Pages 85-128. Preferably an entrained-flow gasifier is used because the process can handle a large variety of feedstock and because a tar-free synthesis gas is prepared. In such a process the feedstock and oxygen are introduced into the reactor co-currently, preferably by means of a suitable burner. Examples of suitable burners and their preferred uses are described in described in U.S. Pat. No. 4,510,874 and in U.S. Pat. No. 4,523,529. The operating conditions are such that the process is operated in a slagging mode, which means that the operating temperature is above the ash melting point. Suitably the carbonaceous feedstock and the molecular oxygen comprising gas is converted to synthesis gas by providing said reactants to a burner as present in a gasification reactor at a pressure of between 3 and 10 MPa and preferably at a pressure between 4 and 8 MPa. The operating temperature is suitably between 1200 and 1800° C. The synthesis gas is preferably cooled to a temperature of below 1000° C., preferably below 600° C. with either direct quenching with evaporating water, direct quenching with a methanol-water mixture of step (b), by indirect heat exchange against evaporating water or combination of such cooling steps Slag and other molten solids are suitably discharged from the gasification reactor at the lower end of the said reactor.

A solid carbonaceous feed may be provided to the burner of the entrained flow gasifier reactor as a slurry in water. Coal slurry feeding processes are for example described in EP-A-168128. Preferably the solid carbonaceous feed is provided to the burner in a gas-solids mixture comprising the solid feed in the form of a powder and a suitable carrier gas, Suitable carrier gasses are nitrogen, carbon dioxide or synthesis gas, i.e. a mixture comprising CO and $H_2$. The carrier gas is preferably carbon dioxide. The use of this carrier gas is for example described in WO-A-2007042562.

The synthesis gas stream generated in step (a) may comprise particulate matter, for example soot particles. Therefore, in a preferred embodiment synthesis gas obtained in step (a) is contacted with scrubbing liquid prior to performing step (b). Contacting is performed in a soot scrubber to remove particulate matter, in particular soot, thereby obtaining the feed synthesis gas stream. The synthesis gas stream obtained in step (a) is generally at elevated temperature and/or elevated pressure. To avoid additional cooling and/or depressurising steps, the scrubbing step in the soot scrubber is preferably performed at elevated temperature and/or at elevated pressure. Preferably, the temperature at which the synthesis gas is contacted with scrubbing liquid is in the range of from 40 to 160° C., more preferably from 110 to 150° C. Preferably, the pressure at which the synthesis gas stream is contacted with scrubbing liquid is in the range of the pressure of the synthesis gas as obtained in step (a).

Steps (b), (c), (d) and (e) of the process of the present invention may advantageously be performed according to the Rectisol Process referred to above. In step (b) the synthesis gas is mixed with methanol, generating a synthesis gas-methanol mixture and the temperature of the mixture is reduced, generating a cooled synthesis gas-methanol mixture. The temperature of the mixture is reduced to preferably between −50 and 0° C. and more preferably to between −40 and −20° C. The cooled synthesis gas-methanol mixture is separated in a liquid methanol-water mixture and a cooled gaseous synthesis gas. In step (c) the cooled synthesis gas obtained in step (b) is contacted with methanol at a temperature of preferably between −70 and 0° C. and more preferably from −70 to −30° C. Preferably, step (c) is performed at a pressure in the range of from 2 to 8 MPa, more preferably from 3 to 8 MPa. At these preferred pressures, the solubility of contaminants such as $H_2S$ and $CO_2$ is higher. In this step, preferably performed in a counter-current scrubbing column, $H_2S$ and $CO_2$ and possible further compounds present in the synthesis gas, such as carbonyl sulphide and hydrogen cyanide, can be removed from the synthesis gas. A rich methanol stream comprising these compounds and a synthesis gas stream depleted in these compounds is obtained. It is preferred to remove at least 80%, preferably at least 90%, more preferably at least 95% and most preferably at least 99% of the carbon dioxide from the synthesis gas.

In step (d) the rich methanol stream of step (c) is regenerated. In this regeneration process $H_2S$ and $CO_2$ and other compounds are removed from the methanol to obtain lean methanol suited for refuse in steps (b) and (c). This regeneration process is well known to the person skilled in the art. Methanol is suitably regenerated by pressure release, for example by a flashing operation, and/or temperature increase, for example by a distillation process. The regeneration is suitably carried out in two or more steps, preferably 3-10 steps, especially a combination of one or more flashing steps and a distillation step.

The lean methanol as obtained in step (d) is reused as methanol in step (b) and (c).

In step (f) methanol as present in the methanol-water mixture obtained in step (b) is recycled to step (a) under conditions such that methanol is converted into carbon monoxide and hydrogen. More preferably this methanol is converted into carbon monoxide and hydrogen by introducing the methanol into the gasification reactor at a position wherein the temperature in the reactor is between 900 and 1800° C. preferably between 1200 and 1800° C. In one preferred embodiment the methanol-water mixture is directly used to prepare a slurry of the feedstock. This slurry can be provided to a burner of an entrained flow gasifier as described above. In another advantageous embodiment the methanol-water mixture is directly injected into the gasification reactor, preferably by means of a dedicated introduction means, for example a lance, or via an optional start-up burner, which burner is idle after start-up and can thus find use as means to add the methanol-water mixture. In another preferred embodiment part or all of the water is removed from the methanol-water mixture as obtained in step (b). The methanol thus obtained is recycled to step (a). This methanol can be introduced via the aforementioned burner or via a separate means as described above for the methanol-water mixture.

Step (f) can be performed on a continuous basis or can be performed at an interval, meaning that steps (a)-(e) are performed continuous and step (f) only when the level of contaminants reaches a certain level. For example between 10 and 50 $m^3$ of methanol can be bled from the system once a month by performing step (f) for a methanol circulation of 200 $m^3$/h.

FIG. 1 shows a preferred embodiment of the present invention. FIG. 1 schematically shows a system 1 for producing and cleaning synthesis gas. In a gasification reactor 2 a carbonaceous stream and an oxygen containing stream may be fed via lines 3, 4, respectively. The carbonaceous stream is at least partially oxidised in the gasification reactor 2, thereby obtaining a raw synthesis gas and a slag. To this end usually several burners (not shown) are present in the gasification reactor 2.

The produced raw synthesis gas is fed via line 5 to a cooling section 6; herein the raw synthesis gas is usually cooled to about 400° C. The slag drops down and is drained through line 7 for optional further processing. The cooling section 6 may be an indirect heat exchanger or a quench vessel. In case of a quench vessel liquid water is preferably injected via line 17 into a synthesis gas stream. Liquid water is preferably injected in the form of a mist. As shown in the embodiment of FIG. 1, the raw synthesis gas leaving the cooling section 6 is further processed. To this end, it is fed via line 8 into a dry solids removal unit 9 to at least partially remove dry ash in the raw synthesis gas. As the dry solids removal unit 9 is known per se, it is not further discussed here. Dry ash is removed from the dry solids removal unit via line 18. After the dry solids removal unit 9 the raw synthesis gas may be fed via line 10 to a wet gas scrubber 11 and subsequently via line 12 to a shift converter 13 to react at least a part of the water with CO to produce $CO_2$ and $H_2$, thereby obtaining a shift converted gas stream in line 14. A shift reaction may be beneficial if the $H_2$/CO ratio has to be adjusted for use in the downstream chemical process. Such a shift reaction is beneficial when the carbonaceous feedstock is coal and the downstream process is a Fischer-Tropsch or a methanol synthesis process. The $H_2$/CO ratio may be influenced by by-passing the shift converter 13 with part of the scrubbed synthesis gas via line 12' and recombining the shifted and non-shifted synthesis gas streams at a suited downstream location upstream of cooler 22. Alternatively the by-passed stream 12 can be sent to a dedicated cooler for mixing with methanol and/or a dedicated absorber for removing contaminants and a rich methanol stream obtained for the by-passed stream 12 can be combined with rich methanol obtained for stream 20 in a common regeneration section. In FIG. 1 the embodiment is shown wherein the combined stream is sent to cooler 22. As the wet gas scrubber 11 and shift converter 13 are already known per se, they are not further discussed here in detail.

FIG. 1 also shows an embodiment wherein the raw synthesis gas in line 12 is heated in a heat exchanger 15 against the shift converted synthesis gas in line 14 that is leaving the shift converter 13.

FIG. 1 shows an embodiment wherein the energy contained in the stream of line 16 as leaving heat exchanger 15 is used to warming up the water in line 17 to be injected in cooling section 6 in case of a quenching vessel. To this end, the stream in line 16 may be fed to an indirect heat exchanger 19, for indirect heat exchange with the stream in line 17.

The synthesis gas stream leaving the indirect heat exchanger 19 in line 20 is mixed with methanol supplied in line 21. The temperature of the mixture is reduced in heat exchanger 22 against a $CO_2$ stream 23, a cleaned synthesis gas stream 24 and a tail gas stream 25. A methanol-water mixture is separated from the cooled mixture in knock-out vessel 26 and discharged via line 27.

In methanol scrubber column 29 the cooled synthesis gas as supplied in line 28 is contacted with lean methanol as supplied via line 30. Methanol scrubber column 29 is provided with cooling means 31. In the upper part of methanol scrubber column 29 the bulk of the $CO_2$ is removed while in the lower part the bulk of the $H_2S$ is removed A portion of the $CO_2$ rich methanol is drawn from the upper part via line 32 and let down in pressure. In $CO_2$ flash drum 33 a flash gas is separated. The $H_2S$ saturated methanol as discharged from the lower part of methanol scrubber column 29 is letdown to flash drum 35 to obtain a second flash gas. Both flash gasses are supplied in line 36 to compressor 34 and subsequently mixed with the methanol/synthesis gas mixture of lines 20-21 of step (b) prior to reducing the temperature of said mixture in heat exchanger 22.

The $H_2S$ saturated methanol as obtained in the flash drum 35 is lowered in pressure and provided via line 37 to the lower part of the so-called $CO_2$ stripper column 39. The $CO_2$ saturated methanol as obtained in flash drum 33 is lowered in pressure and provided via line 38 to the upper part of $CO_2$ stripper column 39 and partly to the upper part of the so-called $H_2S$ concentrator column 41. In column 39 $CO_2$ stream 23 is obtained. The $H_2S$ saturated methanol stream as obtained as the bottom stream in $CO_2$ stripper column 39 is further reduced in pressure and provided to $H_2S$ concentrator column 41 via line 40 to be stripped with nitrogen as supplied via line 42. The methanol as obtained in the bottom stream of $H_2S$ concentrator column 41 in line 43 is distilled in distillation column 44 to remove a last portion of acid gasses as discharged via line 45 to obtain lean methanol in line 46 to be reused in methanol scrubber column 29. Part of the lean methanol via line 48 and the methanol-water mixture as provided in line 27 is provided to the methanol-water fractionator column 47 to remove water as discharged via line 49. A methanol stream is discharged from said column via line 50.

FIG. 1 shows various embodiments of how methanol may be recycled to the partial oxidation step or gasification reactor 2 of FIG. 1. Any one of these embodiments may be used alone or in combination with the other embodiments.

Methanol may be provided to step (a) as part of the methanol-water mixture as present in line 27 via line 51 to the gasification reactor 2.

Methanol may be provided to step (a) as part of the methanol-water mixture as present in line 27 via line 52 as part of the quench water used in cooling section 6. The temperature of the synthesis gas will be sufficient to decompose methanol to synthesis gas.

Methanol may be provided to step (a) as part of the lean methanol as present in line 46 via line 53.

Methanol may be provided to step (a) as part of the top product of the methanol-water fractionator column 47 as present in line 50 via line 54.

Figure 2:
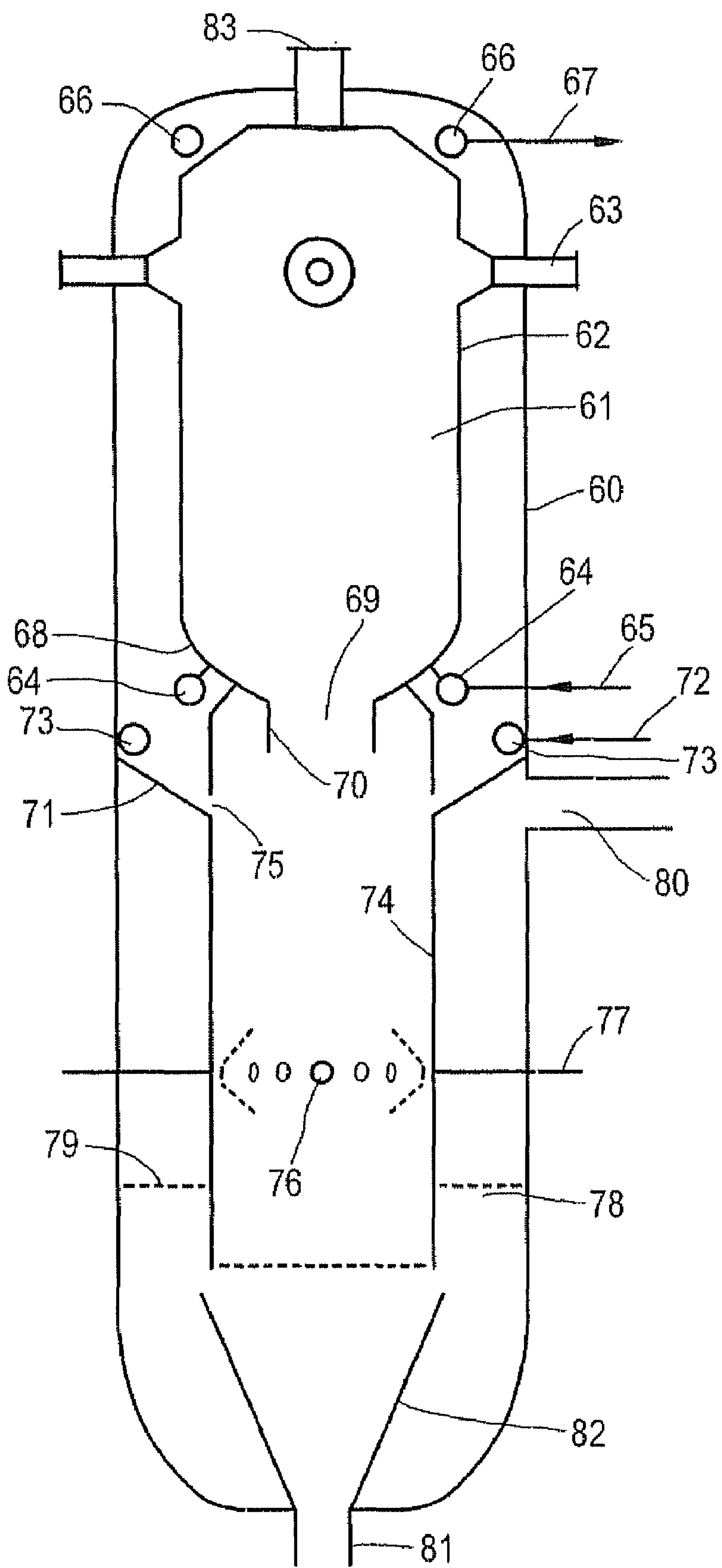
FIG. 2 shows a suitable gasification reactor for performing step (a) in an embodiment of the present invention

FIG. 2 shows a suitable gasification reactor 60 for performing step (a) wherein a cooling section is part of the gasification reactor as will be described below. Reactor 60 is provided with a gasification chamber 61 as defined by a so-called membrane wall 62. Gasification chamber 61 is provided with one or more pairs of diametrically opposed burners 63. The membrane wall is composed of vertical conduits, which are fixed together and in which, in use, a cooling medium, i.e. evaporating water, flows from a distributor 64 to a steam header 66. Distributor 64 is provided with a cooling medium supply line 65 and steam header 66 is provided with a steam discharge conduit 67. At the lower end of the tubular membrane wall a diverging frusto conical part 68 is attached. At the lower opening 69 of said part 68 a tubular part 70, extending downwards is provided to guide the slag and synthesis gas into a diptube 74. By having a opening 69 which is smaller than the diameter of diptube 74 one intends to avoid as much as possible that slag particles contact the inner walls of the diptube 74.

The inner walls of diptube 74 are wetted by a downwardly moving layer of water. This layer of water is achieved by introducing water via line 72 and supply ring 73. The introduced water will flow via a sloped plane 71 to circular opening 75 and further downwards along the inner wall of diptube 74.

Step (f) of the process according to the present invention is performed by introducing methanol or a mixture of methanol and water via supply conduit 77 and nozzles 76 into the flow of synthesis gas. The position in the diptube 74 at which methanol is added will have to be chosen such that the local temperature is sufficiently high to convert methanol to carbon monoxide and hydrogen. More rings of nozzles may be present, wherein lower placed rings are suitably used to add cooling water and the higher placed rings to add methanol according to the invention. Step (f) may alternatively also be achieved by supplying the methanol to the gasification chamber 61.

FIG. 2 further shows a water bath 78 having a surface 79. Through this water bath 78 synthesis gas will be further cooled. The cooled synthesis gas is discharged from the reactor 60 via outlet 80. Slag particles are guided via cone 82 to outlet 81. Part 83 may be a manhole for inspecting the reactor or a start-up burner.

The invention claimed is:

1. A process for producing a purified synthesis gas stream from a carbonaceous feedstock, the process comprising the steps of (a) partial oxidation of the carbonaceous feedstock with a molecular oxygen comprising gas to obtain a synthesis gas comprising water, hydrogen sulphide, and carbon dioxide besides the main constituents carbon monoxide and hydrogen, (b) mixing the synthesis gas and methanol and reducing the temperature of said mixture and separating a liquid methanol-water mixture from a cooled gaseous synthesis gas, (c) contacting the cooled synthesis gas obtained in step (b) with methanol to decrease the content of hydrogen sulphide and carbon dioxide in the synthesis gas, thereby obtaining a rich methanol stream comprising hydrogen sulphide and carbon dioxide and a synthesis gas stream depleted in hydrogen sulphide and carbon dioxide, (d) regenerating the rich methanol stream of step (c) by separating from the rich methanol a carbon dioxide fraction and a hydrogen sulphide fraction to obtain lean methanol, which lean methanol is used as methanol in step (b) and/or (c), and wherein (e) part of the methanol in the methanol-water mixture obtained in step (b) is isolated and reused in step (b) and (c) and wherein, (f) another part of the methanol in the methanol-water mixture obtained in step (b) is recycled to step (a) under conditions such that methanol is converted into carbon monoxide and hydrogen.

2. The process according to claim 1, wherein methanol is converted into carbon monoxide and hydrogen at a temperature of between 900 and 1800° C.

3. The process according to claim 1, wherein in step (a) the carbonaceous feedstock and the molecular oxygen comprising gas are converted to synthesis gas by providing said reactants to a burner as present in a gasification reactor at a pressure of between 3 and 10 MPa.

4. The process according to claim 3, wherein the methanol as recycled to step (a) is provided to said burner.

5. The process according to claim 3, wherein the methanol as recycled to step (a) is separately provided to the interior of the reactor at a location where the temperature of the synthesis gas is between 900 and 1800° C.

6. The process according to claim 1, wherein the methanol as recycled to step (a) is recycled as the water-methanol mixture as obtained in step (b) or as a water-methanol mixture which is obtained after removing part of the water from the water-methanol mixture as obtained in step (b).

7. The process according to claim 1, wherein water is removed from the water-methanol mixture as obtained in step (b) before the methanol is recycled to step (a).

8. The process according to claim 1, wherein step (c) is performed at a temperature in the range of from −50 to 0° C.

9. The process according to claim 1, wherein the synthesis gas of step (a) is contacted with a scrubbing liquid to remove particulate matter prior to performing step (b).

10. The process according to claim 1, wherein part of the lean methanol obtained in step (d) is also recycled to step (a).

11. The process according to claim 1, wherein the carbonaceous feedstock is an ash containing feedstock.

12. The process according to claim 11, wherein the ash containing feedstock is coal.

13. The process according to claim 11, wherein the ash containing feedstock is a solid biomass as obtained by torrefaction of a biomass source.

14. The process according to claim 11, wherein the ash containing feedstock is a liquid biomass as obtained by flash pyrolysis of a biomass source.

* * * * *